Oct. 1, 1940.  R. ESNAULT-PELTERIE  2,216,567
CENTRIFUGING ELECTRICALLY HEATED FURNACE
Filed Dec. 6, 1938  7 Sheets-Sheet 1
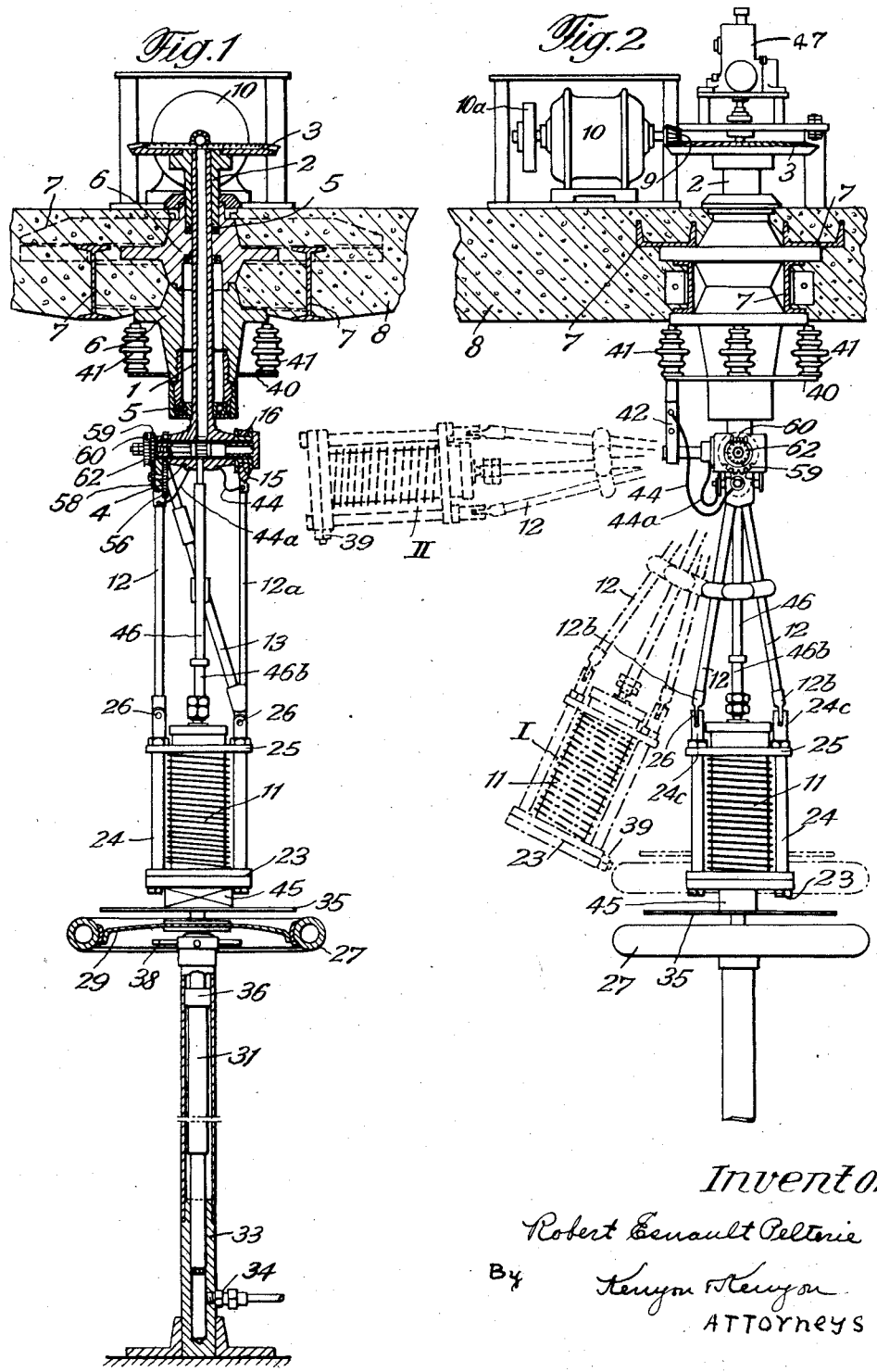
Inventor:
Robert Esnault Pelterie
By Kenyon & Kenyon
ATTORNEYS

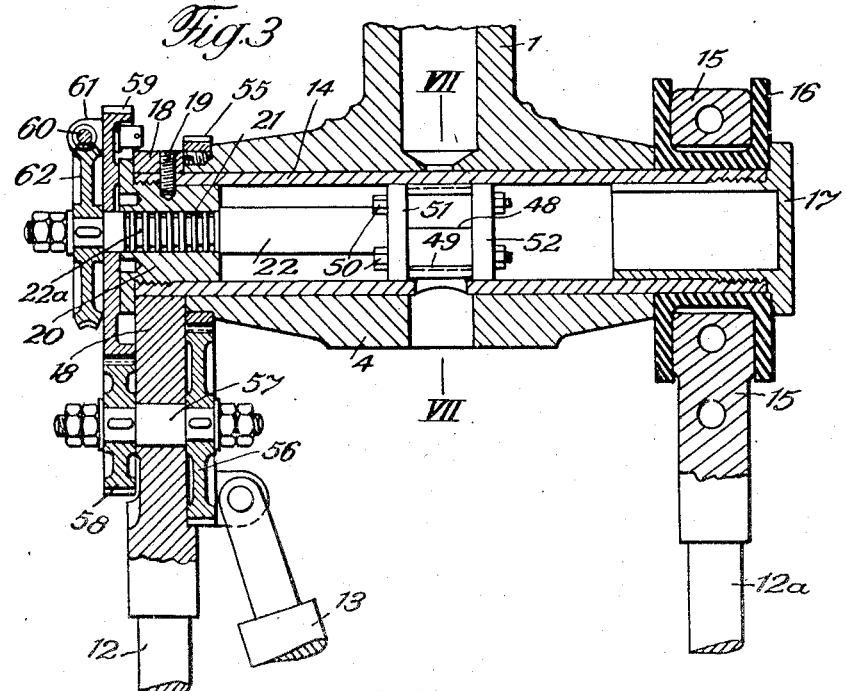

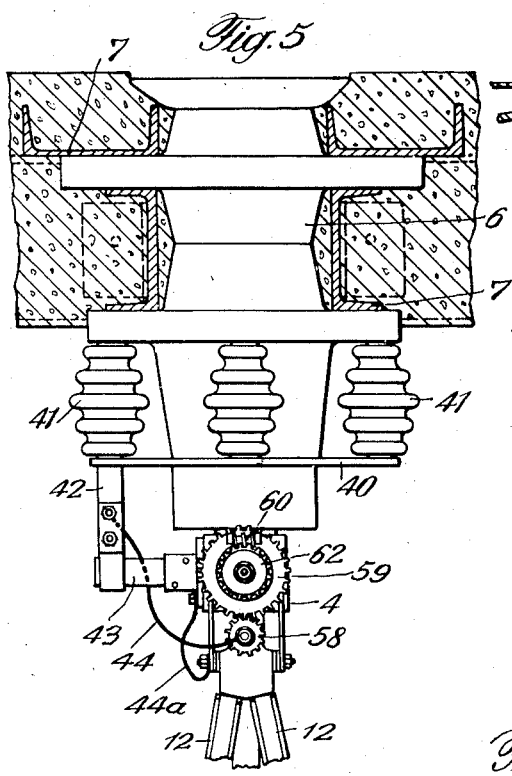

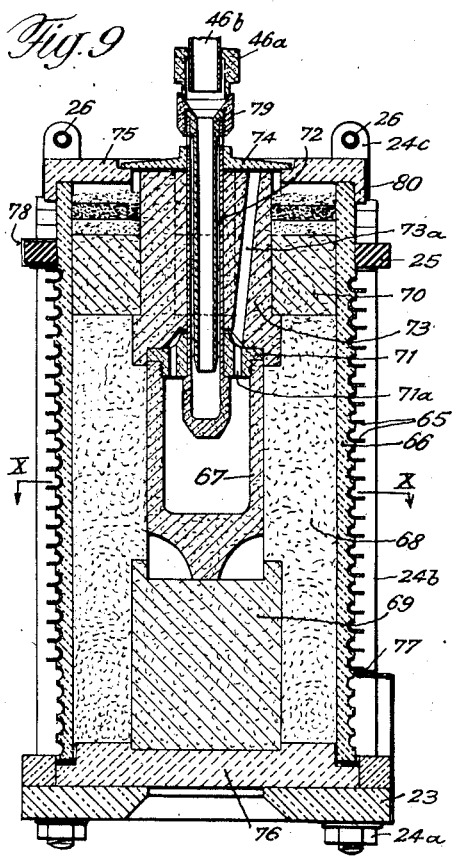
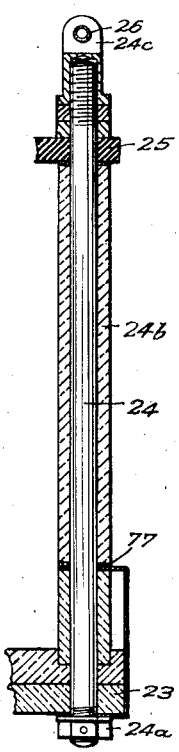
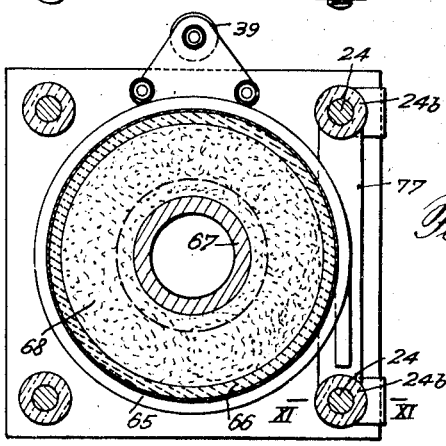

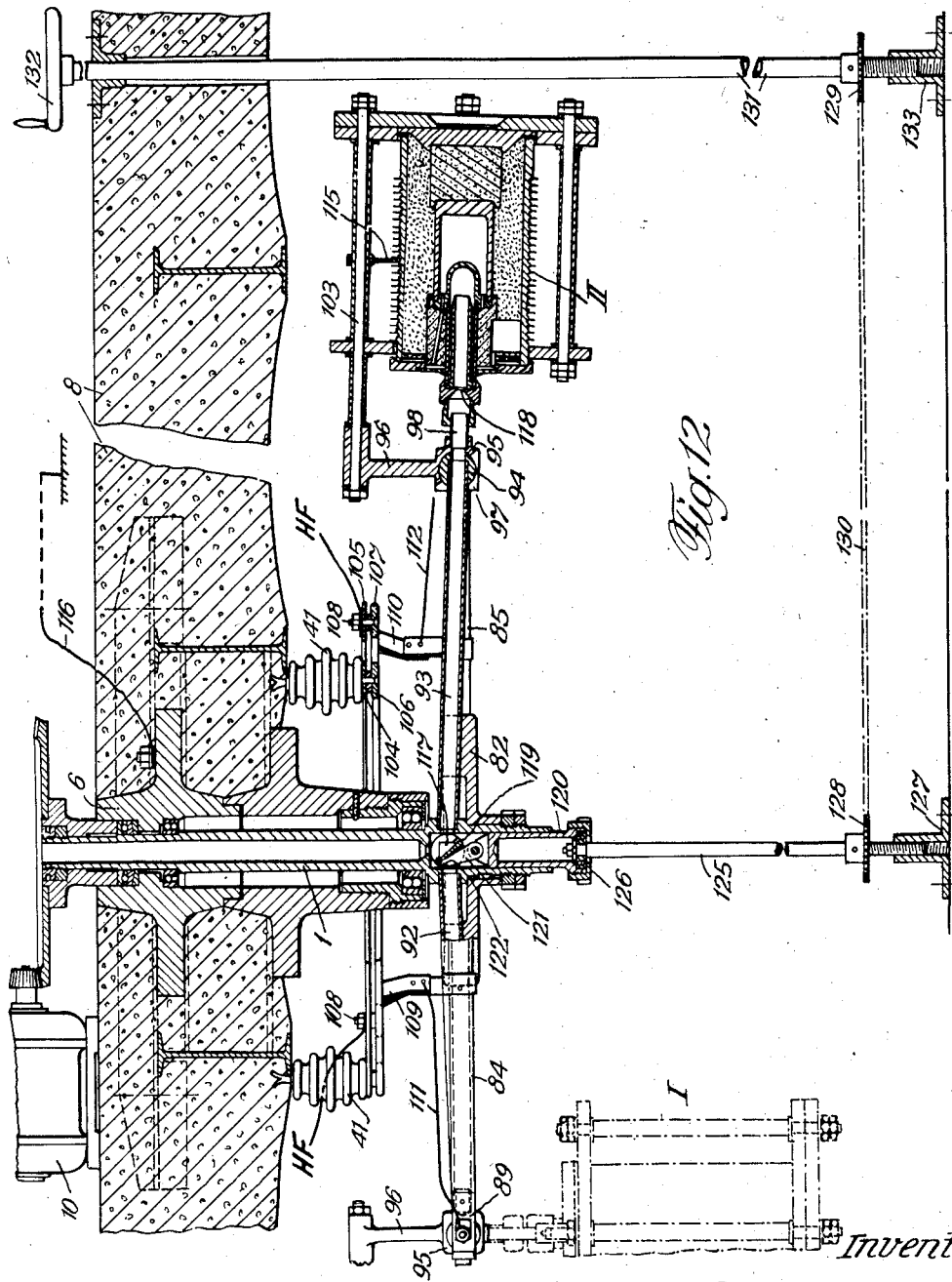

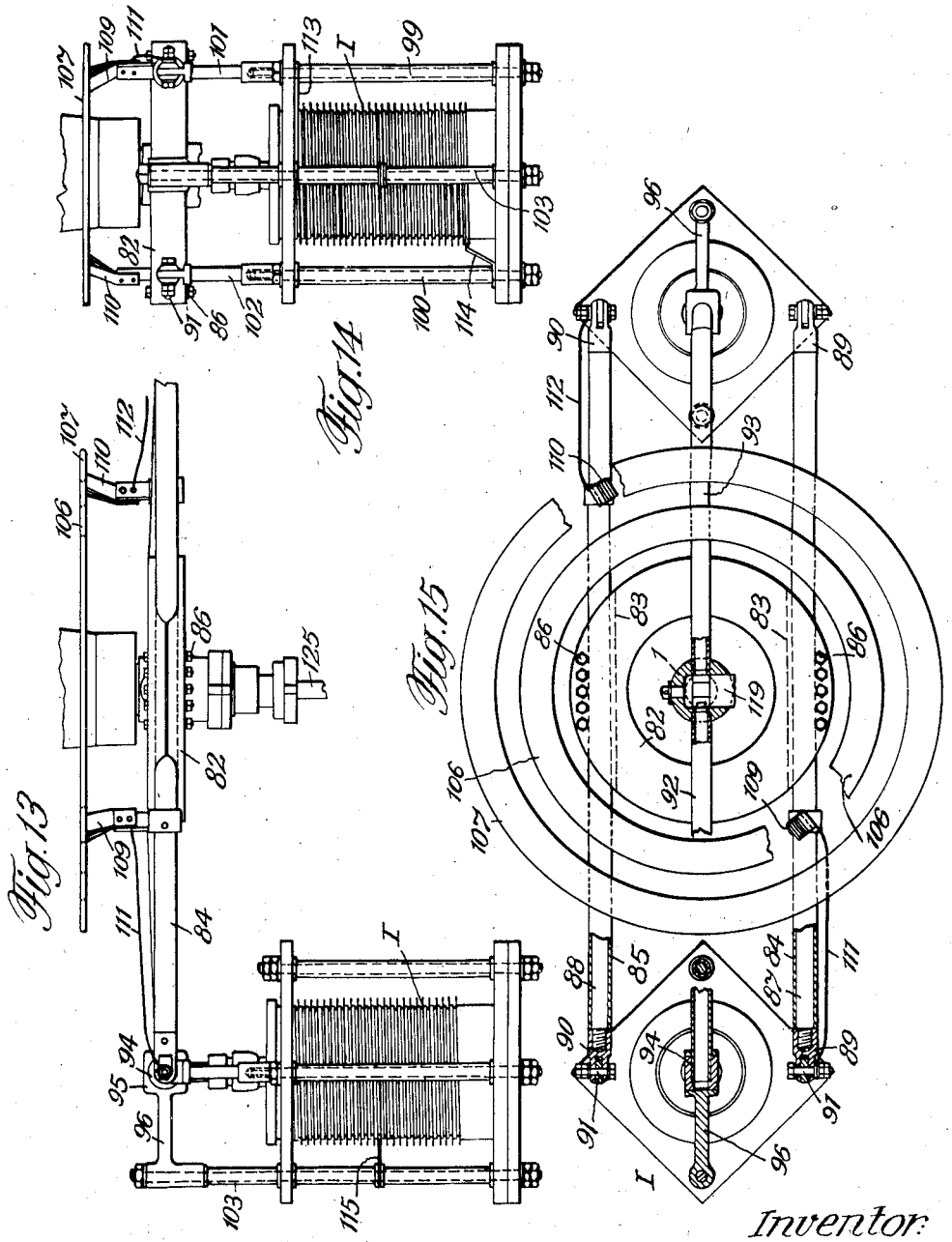

Oct. 1, 1940. R. ESNAULT-PELTERIE 2,216,567
CENTRIFUGING ELECTRICALLY HEATED FURNACE
Filed Dec. 6, 1938   7 Sheets-Sheet 7
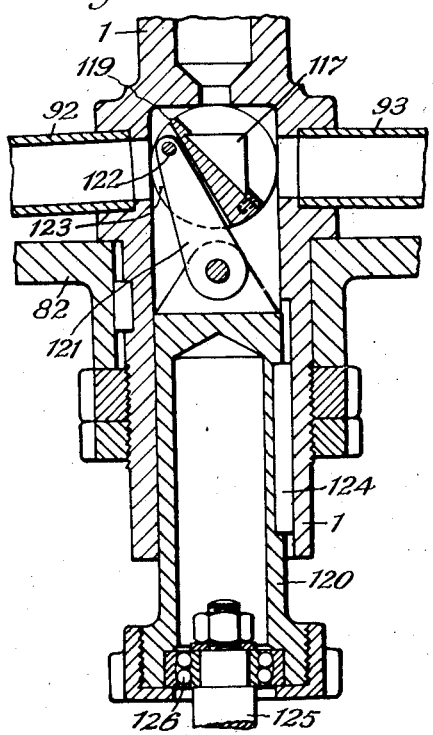
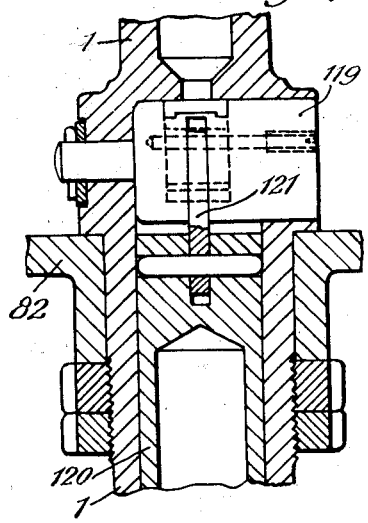
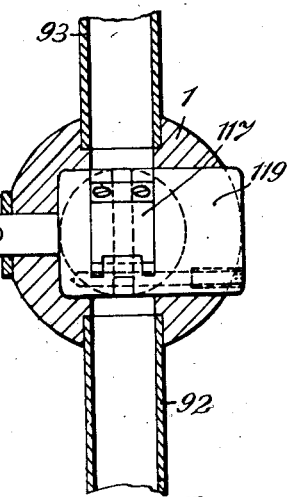
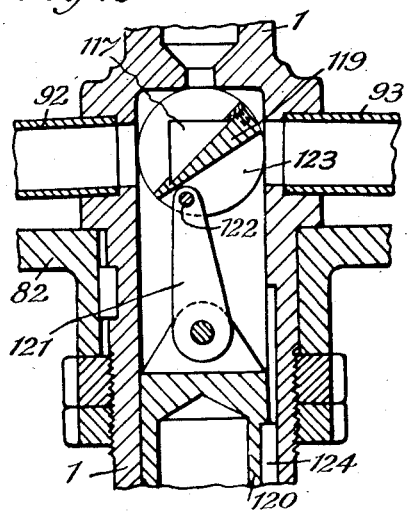
Inventor:
Robert Esnault Pelterie
BY Kenyon & Kenyon
ATTORNEYS Patented Oct. 1, 1940

2,216,567

UNITED STATES PATENT OFFICE 2,216,567

CENTRIFUGING ELECTRICALLY HEATED FURNACE

Robert Esnault-Pelterie, Boulogne-sur-Seine, France, assignor to Spladis Société pour l'Application d'Inventions Scientifiques, Luxemburg, Luxemburg Application December 6, 1938, Serial No. 244,191
In Switzerland December 16, 1937

16 Claims. (Cl. 13—27)

The present invention relates to a centrifugal electric furnace plant (pendular whirling furnace) intended for use in melting and casting or sintering in one single operation articles of ultra-refractory material, of which the melting point is higher than 3000° absolute, approximately.

The furnace may be either of the high frequency induction type, or of the electrical resistance type, especially as the peripheral dimensions of the conductors required for high frequency operation happen to correspond with the cross-section of solid wires, which the very large currents often used in the resistance type of electrical furnace require.

Centrifugal force furnaces have been used for a long time for the casting of pasty substances, or of substances with a high surface tension, but none of these known types have ever united in one furnace the combination of features, which must be present simultaneously, in order to effect a perfect melting and casting of ultra-refractory material.

Large pieces of centrifugal castings are naturally so arranged, that their axis coincides with the axis of the furnace; the small pieces however are arranged, several of them together, symmetrically around the said axis; in short the melt in its entity will always present this natural symmetry; it follows therefore that, in order to ensure the perfect homogeneity of one single piece, or in order to ensure that a plurality of small pieces shall be of uniform quality, the sensible acceleration in the interior of the furnace, shall constantly be directed according to the axis of the latter, which must in some manner have the freedom of assuming by itself the direction of the resultant of the centrifugal force and the weight.

This condition by itself however is insufficient to obtain perfect articles; at the temperatures under consideration, the chemical affinities become very strong, and in order to avoid among other things, that the substances treated shall not become carburised during the prolonged contact with the graphite crucibles or moulds, the time during which the material is in a state of fusion must be reduced to an absolute minimum; naturally too high a temperature, causing ebullition, must be avoided at all costs, as the turbulence of ebullition further increases such reactions. The furnace must allow an accurate measurement of the temperature during the whole duration of the operation, in order to permit the attendant to follow all the incidents of the rise of temperature, and also to allow of any rise in temperature being regulated, when approaching the desired temperature, in order not to exceed it, which in most cases is of considerable importance.

The accuracy of the readings renders it necessary, that the pyrometric chamber be constantly scavenged by a current of a thoroughly dry inert gas such as nitrogen or argon.

In view of the very high temperatures to be used, the only possible heat insulator that can be used is pulverous or powdered carbon, especially lamp black; in a whirling furnace above all, special dispositions must be taken, in order to avoid, that the movement of the ambient air itself shall not be able to cause the latter to penetrate right to the pulverous carbon, which is in fact very finely divided, and of small density, therefore the least intrusion of air, very quickly burns up a volume thereof, which is sufficiently large to form empty pockets in the heat insulating lining, and where such pockets are formed, the external jacket is subjected, unprotected to the extremely fierce radiation from the crucible, and this melts holes in the external jacket in a few seconds; the operation is then a failure, and the furnace is damaged to a very serious extent.

The first condition that imposes itself introduces as a corollary a second one, viz: a furnace of the pendular type can not be started in its rotation without due precaution, because otherwise, it would be torn off its fastenings, or it would, in moving beyond the horizontal, strike against the superstructures which carry them, and these cannot in fact be made of an exaggerated height, without thereby unduly lengthening the pyrometric sighting tube, which would deleteriously affect the precision of the pyrometric readings, and as above stated this accuracy of the pyrometric readings is of considerable importance.

The necessary simultaneousness of the presence of certain conditions, necessitates other ineluctable corollaries, viz: The provision of a permanent circulation of inert gases, makes it impossible to add a circulation of water thereto for the cooling of the inductor solenoid, or of the exterior of the casing; it is therefore advantageous to make use of the rotation of the furnace itself for the purpose, by reason of the ventilation it creates.

The above mentioned conditions are fulfilled in the plant of the whirling furnace according to the present invention, by reason of the fact that the furnace is suspended from a rigid frame articulated by its upper part to the bottom part of a hollow driving shaft, suspended and driven in such a manner, that it can rotate at a regulatable speed, a device for the initial spacing serving to regulate the whirling motion, during starting and coming to rest of the furnace. Means are provided to enable a constant measurement of the furnace temperature to be carried out during the operation of the furnace such means comprising an optical pyrometer centred on the driving shaft, and a reflecting device, the apex of the furnace being connected to a sleeve forming the axis of articulation, by means of a tube, serving for the sighting and at the same time for the injection of the inert gas. The electric winding of the furnace is securely fixed by being embedded in a helicoidal groove provided on the external jacket of the furnace, so that cooling of the winding is fully ensured by reason of the circular motion of the furnace.

None of the furnaces hitherto proposed presents these features in combination, and this is the reason why the above mentioned ultra-refractory materials have hitherto only been produced industrially by means of sintering with a binding agent, which acts similarly to a welding agent between the granules of the refractory powder. But then the temperature of disintegration is the melting temperature of the binding agent, and not the infinitely higher temperature of fusion of the refractory powder (as for example, carbide of tungsten with a melting point of 3150° abs. sintered with cobalt having a melting point of 1760° abs.).

But besides the possibility of obtaining products of ultra-hardness, which are at the same time also ultra-refractory, the installation of the whirling furnace above mentioned has also the advantage of enabling such products to be manufactured by a very much simpler, that is to say cheaper process, which also represents a new in-industrial result of the first order.

In order that the invention may be clearly understood and readily carried into effect reference is made to the accompanying drawings which show diagrammatically and by way of example two constructional forms of a furnace plant in accordance with the present invention.

Figures 1 and 2 partly in section and partly in elevation are views of a complete assembly of a constructional form of a whirling furnace plant, the views being projections on vertical planes at 90° to each other.

Figure 3 drawn to an enlarged scale is a section showing in detail the articulation of the suspension members of the furnace to a rotatable support.

Figure 4 is an elevation looking on the left hand side of Figure 3.

Figure 5 drawn to an enlarged scale shows brush gear for the supply of electric current to the furnace.

Figure 6 drawn to an enlarged scale shows in elevation and in section a wheel fitted with a pneumatic tyre which serves for use in starting and bringing the furnace to rest.

Figure 7 drawn to an enlarged scale is a section on the line VII—VII Figure 3 showing the mounting of a prism which permits sighting of the interior of the furnace from a fixed pyrometer.

Figure 8 drawn to an enlarged scale is a diagrammatic view, illustrating the functioning of the prism referred to in Figure 7.

Figure 9 drawn to an enlarged scale shows a vertical section of the furnace body.

Figure 10 is a horizontal section of the furnace on the line X—X of Figure 9.

Figure 11 is a vertical section of a detail thereof.

Figure 12 is a fragmentary sectional view of a second constructional form of a whirling furnace plant according to the invention, the position of rest of one of the furnaces being shown in dash and dot lines.

Figures 13 and 14 are views in elevation, showing projections on vertical planes at 90° to each other of the pivotal connection of the furnace with the rotatable support.

Figure 15 is a plan view, partly drawn in section, of a portion of the apparatus shown in Figure 12.

Figures 16 and 17, drawn to a larger scale, are sectional views in projection on vertical planes at 90° to each other, of the arrangement of the prism permitting sighting of the interior of one of the furnaces.

Figure 18 is a view analogous to Fig. 16 and shows the prism for sighting of the second furnace.

Figure 19 is a horizontal section of the prism mounting.

The furnaces are hereinafter described as induction furnaces, it being reiterated that this description does not limit the invention in any way.

Description of furnace plant represented in Figs. 1 to 11:

*Driving shaft and suspension frame of the furnace*

A vertical hollow shaft 1 (Figures 1 to 4, 7 and 8) carries a sleeve 2 at its upper end, by means of which it is made integral with a crown wheel 3 with conical teeth, the said shaft terminating at its lower end in a bored horizontal arm 4 which gives it the shape of a T. The shaft 1 rests by means of ball bearings 5 in strong bearings 6 which are supported by metal girders 7 forming the skeleton of a reinforced concrete floor 8 provided for the installation. The shaft 1 passes through the floor 8. Above the floor 8 the shaft 1 is connected by means of the crown wheel 3 to a pinion 9 of an electric motor 10, fitted with a flywheel 10a. Below floor 8 the furnace 11 is secured to shaft 1 by means of the horizontal arm 4, from which the said furnace 11 is suspended by means of rods 12, 12a of a diamagnetic metal, coupled in pairs, in such a manner, that each pair forms a triangular system, as may be seen from Figure 2. Two stays 13 of insulating material are arranged between the two pairs of rods 12, 12a.

Each rod 12, 12a can be surrounded by a sheath of copper, serving as a conductor for the current.

*Articulation*

The furnace 11 and the frame constituted by the rods 12, 12a and the stays 13 form together a rigid unit which can oscillate around the geometrical horizontal axis of the lower part of the shaft 1, which is hereinafter called the "transversal axis". To that effect, the suspension rods 12 and 12a terminate in collars or straps 15 and 16 respectively (Figures 1 and 3) which embrace a metal sleeve 14, adapted to rotate freely in the bore provided within the interior of the transversal axis 4. Due to this articulated suspension, the furnace can execute during its rotation a pendular whirling motion, as shown in dotted lines in Figure 2.

*Current supply gear*

The device for supplying the electric current to the furnace ensures that the current is supplied to the furnace, notwithstanding the rotation of the latter around the geometrical axis of the shaft 1, on the one hand, and on the other hand the pivoting movement of the frame of suspension around the transversal axis 4, as above defined, under the effect of the centrifugal force. To this effect the current supply gear comprises a unit of collector rings and brushes.

For reasons of simplicity the return of the current may be effected by earthing which makes it possible to use only one collector ring, as shown in detail in Figure 5. This collector ring 40, supported by one of the bearings 6 (the lower one) by means of the insulators 41, is connected by a suitable conductor, not shown, to one of the poles of a source of electricity, used for heating the furnace. A flexible brush 42 (Figures 2 and 5) carried by the transversal axis 4, but electrically insulated from it, by means of its rigid support 43, makes constant contact with the collector ring 40. The brush 42 is connected by means of a cable 44 to one of the pairs of furnace suspension rods, the pair 12a for instance, which thus constitutes one of the current supply conductors. To this effect, the bearing 15 (Figures 1 and 3), which carries these rods is electrically insulated from the axis of articulation by means of a socket 16, made for instance of ebonite, mounted upon the sleeve 14, and retained in place by means of a plug 17 screwed into the said sleeve. At their lower ends the rods 12a (which are insulated from the rods 12 by the stays 13) are connected to one of the ends of the furnace-heating winding, as hereinafter explained.

The return of the current is effected by the other pair of suspension rods, the transversal axis 4 via the shaft 1 and the metal of the bearings 6, which are connected to the second pole of the electric supply, and earthed for the sake of safety. A collar 18 (Figure 3) terminating the rods 12 is thus in direct connection with the sleeve 14, and for this purpose it can be made integral with the said sleeve by means of screws 19. These screws serve at the same time as a means of fixing a plug 20, provided with an axial bore, which serves as a bearing for a half spindle 22, the purpose of which is hereinafter explained.

The connection between the rods 12 and the shaft 1 is improved by means of a length of cable 44a, Figures 2 and 5, which is screw connected at its ends to these rods and to the said shaft.

A few precautions are advisable in order to avoid or reduce any danger arising from high tension current with which the furnace is supplied. Thus for instance, in order to avoid all danger to the reader of the pyrometer, the earthing connection to the rods 12 will have to be very carefully made. For this purpose a long metallic tube, buried and provided with holes, into which water under pressure can be forced during heating of the furnace can be used, so as to create around that tube a moist zone, which will enhance the thoroughness of the earthing.

*Device for the initial distancing for the starting and the return to rest of the furnace, forming at the same time a charging table*

This device is indispensable in order to avoid damage when starting the furnace, which might cause the critical speed to be exceeded at the time of leaving the vertical.

A circular table, the periphery of which is fitted with a damping device is arranged horizontally below the shaft 1. This table may for example as shown in Figures 1 and 2 comprise a wheel with a pneumatic tyre 27 arranged in such manner, that its axis is vertical and in line with the shaft 1. As is seen in Figure 6, a hub 28 upon which the disc 29 of the said wheel is mounted, is loosely mounted by means of rollers 30 at the top of a spindle 31 the lower end of which carries a leather or other suitable washer 32, which forms the piston of a hydraulic or pneumatic cylinder 33. By admitting fluid under pressure through a pipe fitting 34 into the cylinder 33, the rise of the rod 31 and of the wheel is effected. The top of the table serves for the purpose of charging, assembling and disassembling the furnace and for this purpose a solid disc 35 forming a table has been provided. The rod 31 carries a collar 36, which when the said rod rises, strikes on the underside of a screw cap 37, provided with grips 38, enabling it to be screwed up or down, in order to regulate the maximum rise of the rod 31 and of the table.

A roller 39 (Figures 2 and 10) mounted on a plate 23 provided at the base of the furnace, is adapted to run on the pneumatic tyre of the wheel 27, when the latter is placed in a suitable position (position indicated in dash and dot lines in Figure 2).

*Design of the furnace proper*

As previously mentioned, this description relates more particularly to the case of a furnace of the so-called "induction" type. As is well known, such a furnace consists in principle of a solenoid, which is supplied from an appropriate source with high frequency electric current, of any desired intensity and generally of a rather high tension, and in the axis of which a crucible made of a suitable refractory and conductive material (usually graphite or amorphous carbon) is placed, which acts as a one turn secondary winding of a coreless transformer, formed by the unit of the said solenoid and crucible.

As represented in Figure 9 a solenoid 65 consists of a profiled strip of a highly conductive metal (copper for instance) slightly flattened, in order to allow a large number of turns per unit of length, and wound to the desired diameter and pitch on a cylindrical tank 66, made of a refractory and insulating material, such as silica for instance. The section of that profile may be of J or U shape so as to constitute gills or fins, which when the furnace functions, serve as means of dissipating the energy lost in the form of Joule heat in the solenoid itself in the ambient air. Over and above the current of air created by the movement of the furnace will through interstices of the turns of the winding help to cool the silica cylinder 66 forming the external jacket of the furnace.

The solenoid not being in itself rigid, and being subjected to a centrifugal force, which may in certain cases multiply its value by 50 or even 100, must be very strongly supported. Practical experience has shown, that the best means of support consist in providing a spiral groove on the outside of the silica cylinder 66 and to engage the solenoid in this groove. This arrangement obviates the insertion, between the turns of ropes of a material which should simultaneously be mechanically very strong, electrically a very good insulator and moreover refractory and non-hygroscopic; experience has proved that no material exists which possesses all these properties to a sufficient degree. The cylinder 66 carrying the solenoid thus embedded, contains in its interior a graphite crucible 67 which receives the substances to be treated, and which is the seat of the currents induced by the solenoid 65.

The crucible 67 is placed in the centre of the cylinder, and is disposed as to its height in such manner, that the substance to be treated is substantially in the median region of the solenoid; it is separated from the cylindrical container by various electrically and thermally insulating substances 68, such as for instance lamp black or powdered amorphous carbon. The crucible 67 being forced by the centrifugal force towards the lower part of the furnace, is supported by a block of porous carbon 69 which at the same time insulates it electrically and thermally from the bottom of the container.

At its upper part the crucible 67 is closed by means of a graphite cover 71, provided axially with a double walled sighting tube 72 extended externally of the furnace by a Pyrex glass tube 46b, which forms the lower end of a tube 46, the purpose of which is hereinafter described.

Above the graphite lid 71, and topping it a block of porous carbon 73 is provided which serves to insulate the crucible electrically and thermally in respect of the top. This block 73 also maintains it in the centre of the furnace by means of a recess with which it is provided on its lower face. It is itself centred in the tank by distance pieces of porous carbon 70 and the interspaces comprised between these distance pieces are filled with lamp black or powdered amorphous carbon, in such manner that the crucible is buried in insulating substances, the contacts with the outer jacket being reduced to a strict minimum. The cover 71 and the block 73 are provided with channels 71a and 73a enabling the fumes or vapours to escape.

Although all the wedging in place be effected by means of pieces of porous carbon, that is to say of a friable material, they are amply sufficient to maintain the crucible and its component parts in place, because in the furnace which is the subject matter of the present invention, there is no transversal component present, except at the moment of the initial acceleration, and this remains always very small.

The cylindrical container 66 is at its upper part closed by a lid or cover 75 of refractory material centred externally and not internally, by means of a rim 80, in such manner as to prevent any penetration of the air by reason of the effect of the relative wind, and consequently any combustion of internal insulating material of pulverous carbon. For the same purpose the cover 75 carries at its central part a much lighter second cover 74, which, acting as a valve enables the gases liberated in the interior of the furnace to escape, but practically prevents the outer air penetrating inside. Thus deterioration by combustion of the members 70, 72 and 73 and of the lamp black 68 serving as heat insulators is eliminated. Finally the container 66 may either have a bottom integral with it, or it may only be a tube having a bottom of refractory material 76 fitted to it, as represented in the drawings.

The furnace unit thus formed is fixed in a frame, which comprises a base plate 23 made of an insulating material, such as Bakelized paste board upon which the bottom plate 76 rests, an insulating collar 25 and columns 24 joining the collar 25 and the plate 23 together between which the container is securely held.

The columns of the preceding frame (Figure 11) are formed by the rods 24 of conductive metal, which pass through the collar 25 and the base plate 23 and are threaded at their ends, on which holding nuts 24a are screwed. An insulating sleeve 24b is arranged around each rod. Caps 24c which accommodate the lower connecting members 12b of the suspension rods 12 and 12a are screwed on their top ends. Spindles or pins 26 which serve to fix the furnace unit proper to the frame of the suspension pass through holes provided in the caps 24c and the connecting members 12b.

The lower end of the solenoid 65 is electrically connected to a metal blade 77, which connects it to the rods 24, and through these latter to the pair of rods 12a, connected by means of the brush 42 (Figure 2) to the high tension supply terminal. The top end of the solenoid is similarly connected by means of the blade 78 to the other pair of rods 12 connected to the frame, as already mentioned.

Measurement and observation of the temperature whilst the furnace is in motion The measurement of the temperature during the centrifuging operation is effected by sighting the interior of the furnace by means of an optical pyrometer, through an orifice provided at the apex of the furnace, at the extremity of the tube 72, fitted with a jointing funnel 79 made of graphite (Figure 9). In this funnel a socket 46a assumes by reason of the centrifugal force a centred position, which by means of an internal rim at its upper part is adapted to slide with as little play as possible on the lower extremity of the tube 46 which, at rest, lies in the extension of the shaft 1 which is hollow (Figures 1 and 2). A pyrometer 47 is rigidly fixed on a stationary frame above the top extremity of the shaft 1. The half-spindle 22 (Figure 3) which has been previously mentioned carries a total reflection prism or a mirror 48, the centre of which coincides with the intersection of the axes of the hollow vertical shaft 1 and of the tube 46. This prism is fixed to this half-spindle by being pushed into a half-cylinder 49, securely held by means of bolts 50 between two plates 51, 52, of which one 51 is integral with the half-spindle 22 (the detail is given in the Figures 3 and 7).

The tube 46 leads to an opening 53 in the articulation sleeve 14 in which it is fixed. This spindle is moreover provided with a second opening 54, which is off set as shown in Figure 8, in such manner that the said opening uncovers the vertical bore of the shaft 1, when the furnace has assumed a certain inclination during its rotation.

The prism then deflects the rays coming from the interior of the furnace through the tube 72 and the tube 46 in such manner, that after deflection, these rays pass through the opening 54 into the shaft 1 and end at the pyrometer 47.

It will be observed from Figure 8 that the rays are nearly perpendicular to the faces of the prism at entering and at leaving, which reduces the luminous losses by refraction at the entry and at the exit.

It is naturally advisable to regulate the angular position of the prism, in order that the emerging rays be directed along the axis of the shaft 1, whatever the variations in the inclination of the furnace may be. (Variations of the speed of the shaft 1.) To this effect a compensating device is provided, imparting to the prism a rotation equal to half the rotation of the furnace and its fittings around the axis of the sleeve 14. Upon the transversal axis of the shaft 1 a toothed crown 55 is mounted, which meshes with a gear wheel 56 of the same radius, keyed to the end of a spindle 57, loosely mounted in the strap 18 of the rods 12. At the other end of this spindle 57 a pinion 58 is keyed, meshing with a gear wheel 59, loosely mounted on the half-spindle 22. The wheel 59 having a radius double that of the pinion 58, it is evident, that if the collar 18, and consequently the furnace and its suspension device, and the sleeve 14 rotate by a certain angle $\alpha$ around the axis of that sleeve by reason of the action of the centrifugal force, the wheel 59 will rotate in the same sense by the extent of the angle of $$\frac{\alpha}{2}$$

This rotation $$\left(\frac{\alpha}{2}\right)$$

is transmitted to the half-spindle 22 and to the prism 48 by means of a tangent screw 60, mounted in bearings 61 integral with the wheel 59, and meshing with the tangent wheel 62 keyed on the end of the half-spindle 22. By turning the tangent screw 60 by means of a squared part 63 provided at the end of its spindle, it is possible to regulate the initial position of the prism 48 in relation to the sleeve 14.

*Device for scavenging the fumes out of the sighting tube*

The gases and fumes which are liberated from the furnace during heating and which would fill the sighting tube 46 would prevent a clear sight of the interior of the furnace being obtained, if no precautions were taken. In order to eliminate this difficulty, a scavenging out of the fumes from the sighting tube has been provided, by means of the injection of inert gases under pressure, such as for instance nitrogen, dried in a column of unslaked lime, thereby also preventing the deposit of steam on the prism. The sleeve 14 with its apertures 53, 54 forms the casing of a cock, which when the furnace is in its centrifuging position, permits the passage into the tube 46 and into the furnace of nitrogen, injected through the hollow shaft 1. This will be easily understood by examining Figure 8.

The spindle 22 (Figure 3) passes through the plug 20 through a labyrinth joint 22a, thus eliminating any losses of the injected gas.

In order to reduce the danger due to the high tension the sighting tube 46 will not consist of metal from end to end, so as to prevent any accidental connection being made between the shaft 1 and the high tension, through the interior of the furnace; the insulation is obtained by means of the Pyrex glass tube 46b.

*Mechanical functioning of the furnace*

The motor 10 being stopped, and the lower table 35 being in its lower position, as is shown in Figures 1 and 2 the unit comprising the suspension rods 12, 12a assumes by gravity a position in the extension of the shaft 1, that is to say a vertical position.

The furnace can then be fixed to the lower ends of these rods, as hereafter explained by way of example.

In order to facilitate such fixing, the furnace resting, with or without the interposition of a wedge member 45, on the disc 35, the wheel 29 is slightly raised by unscrewing the cap 37 Figure 6 by means of the handle grips 38, until the holes in the upper caps 24c register with those provided in the connecting members 12b. The spindles or pins 26 are then introduced into the aforesaid holes, which after they have been secured by pins, render the furnace integral with its suspension members.

The furnace being hooked on and charged (the charging may be effected either before or after the hooking on, according to which is more convenient) the cap 37 is slightly screwed down, then the unit of the furnace and its suspension is drawn away by hand, so as to bring them into the position I shown in dash and dot lines on Figure 2. At this moment the longitudinal axis of the suspension makes an angle of about 20° with the vertical.

By introducing pressure fluid into the cylinder 33, the wheel 29 is caused to rise, until the collar 36 strikes under the screw 37. The latter has previously been suitably adjusted, so that the final position of the wheel 29 allows the roller 39 of the furnace, to rest against the pneumatic tyre 27, as shown in dash and dot lines in Figure 2. Leaving the wheel in that position, the motor is caused to assume a progressive rate of rotation.

The furnace and its suspension frame then begin to rotate around the geometrical axis of the shaft 1, and in this rotation centrifugal force determines the pivoting motion of the rods 12 and of the furnace around the axis of the tube 14 in the transversal axis 4, until the resultant of the weight and the centrifugal force passes through that axis. The furnace thus describes a circle of a large radius, having its centre in the extension of the shaft 1 (position II, Figure 2).

The circuit of the heating current being closed, the substance is heated and melted at the same time as it is centrifuged, and whilst its temperature can be measured.

When the desired temperature is obtained, the heating current is cut off, and the furnace is allowed to continue its rotation until sufficiently cooled down.

Then, the current of the motor 10 is cut off, the rotation slows down, and the furnace gradually approaches the vertical; its roller 39 meets the pneumatic tyre 27 of the wheel 29, which attenuates the shock, and the said roller 39 runs for an instant on the wheel, which avoids the effect of the mass against the latter.

When the furnace is stopped, it is drawn apart by hand, the wheel 29 is lowered, the furnace is allowed to assume its vertical position in the extension of the shaft 1, and it can then be unhooked in order to discharge it, by proceeding in the reverse manner of that employed on assembling.

The products which can be produced by this furnace are for example:

Tool tips (at the present time obtained by sintering with cobalt), phonograph needles of long life; cutlery (especially razor blades); nozzles for sand blasting machines, for blast furnaces, etc. everlasting bearing liners, balls, ball races, stops screwing dies; seats and valves for high pressure hydraulic devices; tools for working stones and minerals (perforating drills, stone saws); glaziers' diamonds, electric current breaking contacts, turbine blades and nozzles, especially for aircraft turbo-motors, or for compressors for aircraft engines; valve bodies and seats, pliers, vises and non fusible tools, or oxi-hydrogen blow pipes for autogenous welding or similar purposes, hearts for gas generators, and more especially hearts and nozzles of gas generators for motor cars, these objects thus possessing the properties of hardness, and non-fusibility, which they require, separately or conjointly.

In the example represented in Figs. 12 to 19 the furnace proper is constructed in analogous manner as the furnace proper described with respect to Figs. 9 and 10. There are however two furnaces suspended at points which are situated diametrically opposed relative to the axis of the driving shaft.

Driving shaft and suspension frame

The vertical hollow shaft 1 has its upper portion constructed in similar manner as that described with respect to Fig. 1. To its lower portion is keyed a circular disc 82 (Fig. 12). On this disc are provided at equal distances from the vertical axis two horizontal bores 83 which may be threaded with a fine pitch and which clamp insulating tubes 84 and 85 (for example made of Bakelite covered card-board, Fig. 15). The disc is horizontally slotted according to the axis of the bores to a depth which is sufficient to permit clamping of the tubes 84 and 85 by the bolts 86 (Figs. 13, 14, 15). The tubes are reinforced by internal rods 87 and 88 made for example of duraluminium the threaded ends of which are screwed onto heads 89 and 90 which carry journals 91 for suspending the furnaces. These heads 89 and 90 serve at the same time to lock the rods 87 and 88 against longitudinal movement in the tubes 84 and 85, respectively (Fig. 15).

Sighting tubes 92 and 93 feeding an inert gas are inclined relative to the horizontal on an angle corresponding approximately to the mean position of the axes of the furnaces with respect to their extreme positions at maximum and minimum turning speed which is tolerated by the apparatus. Each of these tubes opens with one of its sides in the hollow shaft 1; its other end carries a hub 94 the axis of which coincides with that of the journals 91. On this hub is pivoted the head 95 of a link 96 connected to the furnace; this head 95 which is recessed at 97 (Fig. 12) in order to permit the passage of the tubes 92 or 93 when the furnace turns about the journals 91, supports the portion 98 of the sighting tube.

Articulation of the furnace proper

The example represented in Figs. 12 to 19 is shown as having two furnaces disposed symmetrically with respect of the central axis of rotation; each of the furnaces is constituted as described with respect to Fig. 9. Diametrically opposed columns 99 and 100 (Fig. 14) are screwed to suspension rods 101 and 102 which are articulated to the journals 91. On a third column 103 is attached the link 96 (Figs. 12 and 13). I indicates the position of rest of the furnaces, II is the mean position during operation (Fig. 12).

Current supply to the furnace

The system of feeding of current is realised in the following manner: two conducting rings 104 and 105 of red copper (Fig. 12) receive current from one of the poles of the high frequency current source, through conductors HF. These rings are connected to the collector rings 106 and 107 of rustless steel (Figs. 12, 13, 15) by a plurality of bolts 108 of red copper. These two pairs of rings are secured to the concrete floor 8 and are electrically insulated from this latter by the insulators 41. The current is taken off from the collector 106 by a brush 109 which is fixed on the tube 84, and from the collector 107 by a brush 110 which is fixed on the tube 85 (Figs. 12, 13, 14).

The conducting cable 111 electrically connects the brush 109 to one of the heads 89 of the rod 87 and accordingly to the other head 89 by the rod 5; the current is transmitted to the columns 99 of the two furnaces by the intermediary of the suspension rods 101 (Figs. 14 and 15). In the same manner the conducting cable 112 connecting the brush 110 to the head 90 transmits the current to the columns 100 by the intermediary of the suspension rods 102.

The ends of the solenoid of each furnace are connected to one of the leads of the high frequency current; for example the upper winding of each solenoid is connected to the column 99 by the conductor 113, and the bottom winding of each solenoid is connected to the column 100 by the conductor 114 (Fig. 14). It will be seen that the furnaces are electrically connected in parallel by the intermediary of the rods 87 and 88. The connection to the earth is obtained by means of a conductor 115 connecting the median point of each solenoid to the column 103 (Figs. 12 and 13). The bearing 6 of the shaft 1 is earthed by means of the conductor 116.

Instead of having the collector rings stationary and the brushes moving with the driving shaft, the brushes could be mounted on a stationary part and the collector rings could be carried by the insulating sleeves 84 and 85.

Measurement and observation of the temperature

The measure of the temperature is obtained by means of an optical pyrometer (not shown) which is placed at the upper portion of the shaft 1 in the same manner as the pyrometer 47 in Fig. 2. Sighting is made by the intermediary of the mirror or the totally reflecting prism 117 (Figs. 12, 16–19) which permits sighting along the axes of the tubes 92 and 93. As has already been described, these tubes are downwardly inclined relative to the horizontal, substantially according to the median line of the angle determined by the axis of the furnace in the two extreme positions of operation of the furnace. The entrance of the sighting tube of the furnace carries a diaphragm 118 (Fig. 12) in such manner that even in the extreme angular positions of the said furnace the visible portion which is seen across the diaphragm is always entirely placed on the bottom of the sighting chamber.

The position of the prism 117 can be adjusted during operation of the furnace in such manner as to center the luminous point which is observed in the pyrometer and to sight into one of the furnaces or into the other. For this purpose the prism is mounted on a prism carrier 119 (Figs. 16 and 18); the reflecting plane is disposed so as to pass across the axis of rotation of the prism carrier 119 which is perpendicular to the axes of the tubes 92, 93 and of the shaft 1 at their point of intersection.

The rotation of the prism carrier 119 about its own horizontal axis is obtained by the vertical displacement of the sleeve 120 sliding in the lower portion of the shaft 1 and acting on the connecting link 121 articulated with its lower end to the top of the sleeve 120 and with its upper end to a pin 122 (Fig. 16); this link moves in a slot 123 of the prism carrier 119. The sleeve 120 rotates together with the shaft 1 owing to a key 124 (Figs. 16 and 18) and is moved in longitudinal direction by driving rods 125, while being freely rotatable on this rod, by the intermediary of a ball bearing 126 (Figs. 12 and 16).

The longitudinal displacement of the rod 125 which determines the position of the prism carrier 119 is obtained by screwing the rod into or unscrewing it from a bearing 127 fixed to the ground (Fig. 12). For this purpose a chain pinion 128 is carried by the lower portion of the rod 125 and connected to a second pinion 129 by a chain 130. A vertical shaft 131, to which is fixed the chain pinion 129, is situated outside of the path of the operating furnaces. This shaft traverses the floor 8 and carries at its upper end a handwheel 132, while its lower end is screwed in a bearing 133, the screw thread having the same pitch as that of the shaft 125 in the bearing 127. The chain pinions 31 and 32 thus remain in the same horizontal plane.

Fig. 16 shows the prism 117 sighting in one of the furnaces and Fig. 18 shows the prism sighting in the other furnace. The maximum angle of rotation of the prism carrier 119 for sighting alternately in each furnace is about 90°; it will be seen that the point of articulation 122 of the link 121 on the prism carrier 119 is chosen so as to avoid any dead point, as will be understood when inspecting Figs. 16 and 18.

The scavenging of the fumes by inert gases is made through the shaft 1, the tubes 92 and 93 and the tube portions 98 under the same conditions as had been described with respect to Figs. 1 to 8.

In the example according to Figs. 12 to 19 the furnace can be operated with an acceleration being 100 to 200 times above the acceleration of gravity, while in the example according to Figs. 1 to 11, only an acceleration between the limits from 1 to 50 times the acceleration of gravity can be used. In the first case, however, it is not possible to go below an acceleration of 10 times the acceleration of gravity, as with a lower acceleration sighting would not be possible by means of the described apparatus, but would require complicated devices necessitating of correcting the observations in accordance with the angle of inclination of a second mirror which would have to be articulated in the axis of articulation of the furnace itself.

Between an acceleration of 10 times that of gravity and infinitely great acceleration the angle of inclination of the furnace relative to the horizontal varies between 5° 43' and 0°. The sighting system, in the example according to Figs. 12 to 19, makes use of this small angle, by means of the sighting tubes 92 and 93 which are slightly inclined relative to the horizontal, this inclination being established to coincide approximately with the bissectrix of the said angle, so that according to the speed of rotation, the furnaces are moving slightly above or slightly below this bissectrix.

While I have described certain preferred forms of my invention, it is obvious that various changes and modifications may be made in the apparatus above set forth without departing from the spirit and scope of the invention as defined in the appended claims.

I claim:

1. A centrifuging electrically heated furnace for use in fusing and casting ultra-refractory materials in one operation, by subjecting the materials to the action of a centrifugal force of a controllable intensity and in an atmosphere of non-oxidizing gas, comprising a hollow rotary driving shaft, supporting means secured to said shaft and rotatable therewith, means for rotating said shaft at any desired speed of rotation, a furnace pivotally suspended from said supporting means and adapted when said shaft rotates to be rotated in a circular path having the axis of said shaft as its center, sighting means for observing and measuring the temperature in the furnace during rotation thereof, said sighting means comprising an optical pyrometer centered on the driving shaft, a tube connecting the interior of the furnace with the interior of said hollow shaft and serving for sighting purposes and for injecting non-oxidizing gas into the furnace, and means positioned at the point of junction of said shaft and said tube for deflecting light-waves issuing from said tube into the field of vision of said pyrometer, whereby the temperature of the contents of said furnace may be observed and measured by said pyrometer while said furnace rotates in said path.

2. A centrifuging electrically heated furnace comprising a vertical hollow rotary driving shaft, supporting means secured to said shaft and rotatable therewith, a furnace pivotally suspended from said supporting means to permit oscillation of the furnace in a vertical plane upon rotation of the shaft, sighting means for observing and measuring the temperature in the furnace during rotation thereof, said sighting means comprising an optical pyrometer centered on the hollow driving shaft, tubular means connecting the top of the furnace with said hollow vertical driving shaft, a reflecting device positioned adjacent the axis of said driving shaft for deflecting into said hollow shaft the luminous rays emitted by the furnace through said tubular means, said tubular means serving for sighting purposes and for injecting non-oxidizing gas into the furnace.

3. A centrifuging electrically heated furnace comprising a substantially vertical hollow driving shaft, supporting means secured to said shaft and rotatable therewith a furnace suspended from said supporting means in such manner as to permit oscillation of the furnace in a vertical plane under the influence of centrifugal force when said shaft rotates, the external face of the furnace being provided with a helical groove, an electric inductor winding disposed in said groove and provided with an extending fin whereby cooling of the winding is obtained by motion of the air relative to the furnace during rotary movement thereof, sighting means for observing and measuring the temperature in the furnace during rotation thereof, said sighting means comprising an optical pyrometer centered on the driving shaft, tubular means connecting the top of the furnace to the interior of said hollow driving shaft, and a reflecting means positioned adjacent the axis of said driving shaft and tubular means whereby light-waves emanating from the interior of the furnace are observable in the said pyrometer.

4. A centrifuging electrically heated furnace comprising a substantially vertical hollow driving shaft, supporting means secured to said shaft and rotatable therewith, a furnace suspended from said supporting means in such manner as to permit pendular motion of the furnace upon rotation of said shaft, a plurality of suspension rods connecting the furnace to said supporting means, certain of said rods being electrically insulated with respect to the other rods and to said driving shaft, an electric heating winding disposed on the external face of the furnace, an electric circuit connected to said winding by the intermediary of said suspension rods, tubular means connecting the top of the furnace to the interior of said hollow driving shaft, sighting means including an optical pyrometer centered on the hollow driving shaft for observing and measuring the temperature in said furnace during rotation thereof, and a reflecting device positioned adjacent the axis of said driving shaft and within said tubular means for directing the luminous rays emitted by the furnace into said hollow driving shaft.

5. A centrifuging electrically heated furnace comprising a substantially vertical hollow driving shaft, a rigid frame having its upper portion articulated to the lower end of said hollow shaft, a furnace suspended from said frame, means for initially side-spacing the furnace to moderate its slinging movement at the start and at the return to rest, sighting means for permanently observing and measuring the temperature within the furnace during operation thereof, said sighting means comprising an optical pyrometer centered on the driving shaft, a sleeve forming the axis of articulation between said frame and the hollow driving shaft, a tube connecting the apex of the furnace to said sleeve and serving for sighting purposes and for injecting inert gas into the furnace, and a reflecting device whereby light-waves issuing from the furnace through said tube are continuously directed to said pyrometer.

6. A centrifuging electrically heated furnace comprising a substantially vertical driving shaft, a rigid frame having its upper portion pivotally connected to the lower end of said hollow driving shaft, a furnace suspended from said frame for rotation around the axis of said hollow shaft, means for initially side-spacing the furnace relative to axis of said shaft, said means comprising a wheel in axial alignment with said shaft, a pneumatic tyre on said wheel, and means for vertically adjusting said wheel to raise the wheel after charging of the furnace and maintain the furnace laterally of the axis of the shaft for starting rotation of the furnace.

7. A centrifuging electrically heated furnace comprising a substantially vertical hollow driving shaft, a rigid frame having its upper end articulated to the lower end of said driving shaft, a furnace suspended from said frame, a sleeve forming the axis of articulation between said frame and said hollow driving shaft, a tube connecting said sleeve to the top of the furnace, means on the sleeve establishing a communication between said tube and the interior of the hollow driving shaft, an optical reflecting device mounted within said sleeve in the axis of articulation of the frame, gear wheels connecting said frame to the reflecting device to communicate movement to said device upon a pendular movement of said frame, the ratio of transmission of said gears being such that the light rays emitted by the furnace through said tube and reflected by said device remain centered in the driving shaft.

8. A centrifuging electrically heated furnace comprising a substantially vertical hollow driving shaft, a furnace supported outside of the axis of said driving shaft, being supported by and rotating with said driving shaft, sighting means for observing and measuring the temperature within the furnace, said sighting means including a transverse tube connected with said hollow driving shaft and slightly downwardly inclined relative to horizontal towards the furnace, and a reflecting device adjacent the axis of the driving shaft for reflecting the luminous rays emitted by the furnace through said transverse tube into said hollow driving shaft.

9. A centrifuging electrically heated furnace comprising a substantially vertical hollow driving shaft, transversely extending rods carried by the lower end of said shaft, two rigid frames articulated to said rods at points thereof disposed symmetrically on opposed sides of the axis of the driving shaft, a furnace carried by each of said frames, said furnaces being capable of oscillating in opposed directions in vertical planes upon a movement of rotation of the driving shaft, the axis of the furnaces being inclined from the horizontal between approximately 6° and 0° during operation thereof, and tubes connecting the lower end of the driving shaft with the top of each furnace, said tubes being inclined relative to the horizontal according to the bissectrix of the angle determined by the axis of the furnaces in the two extreme positions of oscillating movement during operation.

10. A centrifuging electrically heated furnace comprising a hollow vertical driving shaft, transversely extending rods carried by the lower end of the driving shaft, two furnaces articulated to said rods at points thereof disposed symmetrically on opposed sides of the axis of said driving shaft, two sighting tubes connecting the top of each furnace with the lower end of the driving shaft, said tubes being slightly inclined relative to the horizontal, a reflecting device disposed at the lower end of said hollow driving shaft between the inner ends of said sighting tubes for reflecting the image of the sighted incandescent portion of the furnace into said hollow shaft, and means for turning said reflecting device to permit alternative sighting into one or the other of the two furnaces during operation thereof.

11. A centrifuging electrically heated furnace comprising a substantially vertical hollow driving shaft, a disc keyed to the lower end of said shaft, transversely extending suspension rods carried by said disc, two furnaces articulated to said rods at points diametrically opposed relative to the axis of the driving shaft, two sighting tubes extending in diametrically opposed directions from the lower end of said shaft and connected each with the top of one of the furnaces, a reflecting prism movably mounted between the inner ends of said sighting tubes, a fixed supporting means and a rotating supporting means, the latter carried on said disc, collector rings and brushes, the collector rings being mounted on one of said supporting means, the brushes on the other thereof, whereby said collector rings and brushes contact each other in relative motion, and electric conductors whereby electricity from a source of current supply is conducted through said collector rings and brushes to the furnaces, the furnaces being connected in parallel.

12. In a centrifugal furnace, the combination of a rotatable shaft having an axial bore, crucible supporting means secured to said shaft and rotatable therewith, a crucible supported upon said means and adapted to revolve in a circular path about the axis of said shaft as said shaft rotates, a tube interconnecting the interior of said crucible and the bore of said shaft and affording a path when the crucible is revolving for the passage of a beam of light originating in the contents of said crucible to a point adjacent the axis of said bore, light-deflecting means positioned adjacent the axis of said bore to receive and deflect said beam of light, a pivotal mounting for said light-deflecting means whereby said beam of light may be deflected into said bore and in a direction parallel to its axis, and means to measure the temperature of the contents of said crucible adapted to receive said beam of light from said bore.

13. In a centrifugal furnace, the combination of a rotatable shaft having an axial bore, a pivotal mounting secured upon said shaft for rotation therewith, the axis of said mounting substantially intersecting the axis of said bore, a crucible supported upon said pivot and adapted, when the shaft rotates, to revolve in a circular path around the axis of the shaft, a tube interconnecting the said crucible and the bore of said shaft and affording a path for the passage of a beam of light originating in the contents of said crucible to a point adjacent the intersection of the axis of said pivot and said bore, light-deflecting means positioned adjacent the said point last mentioned to receive and deflect said beam of light, a rotatable mounting for said light-deflecting means, means to rotate said last mentioned mounting proportionally to the rotation of the crucible upon its pivot whereby said beam of light is deflected in a direction parallel to the axis of the bore of said shaft, and means to measure the temperature of the contents of said crucible adapted to receive said beam of light from said bore.

14. In a centrifugal furnace, the combination of a rotatable shaft having an axial bore, crucible supporting means secured to said shaft and rotable therewith, a crucible supported upon said means and adapted to revolve in a circular path as said shaft rotates, a tube interconnecting the interior of said crucible and the bore of said shaft and affording a path when the crucible is revolving for the passage of a beam of light originating in the contents of said crucible to a point adjacent the axis of said bore, light-deflecting means adjacent the axis of said bore to receive and deflect said beam of light, a pivotal mounting for said light-deflecting means, manual means to adjust the angular position of said light-deflecting means upon its pivotal mounting whereby said beam of light may at will be deflected into the interior of said bore and in a direction parallel to its axis, and means to measure the temperature of the contents of said crucible adapted to receive said beam of light from said bore.

15. In a centrifugal furnace, a furnace member, means to rotate said furnace member in a circular path at relatively high speed, said furnace member including a cylindrical refractory outer shell closed at one end remote from the center of rotation and an inductor winding about the said shell adapted when energized to induce high temperatures at the center of the furnace member, a relatively heavy refractory cover for the open end of said shell having a flanged central opening for the escape of fumes from said furnace and having a depending flange engageable with the outer surface of said refractory shell, and a relatively lighter refractory valve member seatable by centrifugal force upon the flange in said opening to control the escape of fumes from said furnace.

16. In a centrifugal electrically heated furnace, a hollow driving shaft adapted to conduct a supply of scavenging gas under pressure, a mount secured to and rotatable with said shaft and having a pivot, a crucible supported from said mount and adapted when said shaft rotates to swing in a pendular manner about said pivot as a center from a position of rest towards an operating position, a conduit for scavenging gas interconnecting said hollow driving shaft and the interior of said crucible, and a valve operatively associated with said pivot for controlling the passage of gas through said conduit, said valve being adapted to open as the crucible swings upon its pivot towards operating position and to close as the crucible swings in the reverse direction upon said pivot.

ROBERT ESNAULT-PELTERIE.